United States Patent [19]

Muchnick

[11] 4,340,826

[45] Jul. 20, 1982

[54] LOW CURRENT PILOT LIGHT AND SWITCH

[75] Inventor: Paul Muchnick, Norwalk, Conn.

[73] Assignee: Harvey Hubbell Incorporated, Orange, Conn.

[21] Appl. No.: 261,507

[22] Filed: May 7, 1981

[51] Int. Cl.³ .................... H02J 9/02

[52] U.S. Cl. .................... 307/157

[58] Field of Search .................... 307/154, 157

[56] References Cited

U.S. PATENT DOCUMENTS 3,825,769 7/1974 Alford, Jr. .................... 307/157

*Primary Examiner*—Michael L. Gellner

*Attorney, Agent, or Firm*—Jerry M. Presson

[57] ABSTRACT

An indicator light for a switch to show when a remote load is energized is provided for installations where no neutral wire is available at the switch box. A circuit including a gas discharge indicator lamp, a diode-resistor charging circuit and a capacitor across the lamp is connected between the load side of the switch and the grounding conductor in the switch housing. Current through the circuit is sufficiently small to create no hazard.

6 Claims, 6 Drawing Figures

LOW CURRENT PILOT LIGHT AND SWITCH

This invention relates to electrical switches and particularly to switches of the type having pilot lights associated therewith to indicate the state of energization of a circuit controlled by such a switch.

BACKGROUND OF THE INVENTION

It is quite often desirable to provide an indicator light to show when a load circuit is energized. This is often true in a home or office, especially when the load device, such as a lighting circuit or other appliance, is of a type or in a location such that it is not visually apparent at the switch location when the load is energized. For example, a lighting circuit for an attic or other seldom used location can be left energized for long intervals of time if, as is true in many homes, the switch is located in a hallway or the like but the lights themselves are not visible when the access door is closed. This results in considerable wasted energy and can even create a fire hazard.

It is well known to provide a switch unit having a pilot or indicator light built in so that the indicator light is energized whenever the switch is in the "on" position. However, for such units to be usable in accordance with building codes, special wiring provisions must be made because, normally, the switch box does not have a neutral wire in it. Depending on location, it may be expensive and difficult to run extra wire in new construction to provide the neutral. In the situation where a switch unit with an indicator is being installed in existing construction, running new cable to provide the necessary neutral can be prohibitively expensive and also difficult.

It would be theoretically possible to connect a pilot light between the hot wire and the grounded wall box. However, such a connection would create a serious hazard because of the substantial ground current created and would be in violation of every known building code. Such codes normally do not permit the ground wires to carry load current, but it is generally recognized that certain types of loads, such as heater wires and the like, do have leakage currents to ground. These leakages are generally limited to 0.5 ma in hospitals and about 5 ma in other applications. However, intentional ground wire load currents of those magnitudes associated with equipment would not be sanctioned by Underwriters Laboratories. Currents at the 0.5 ma level, even though too high for acceptability, would not illuminate an indicator light of a type which could be seen under most ambient light conditions. As a result, indicator lights on switches are used rather rarely. Responsible agencies such as UL have indicated that intentional ground wire load currents substantially below the 0.5 ma level might be viewed as neglible and acceptable.

BRIEF DESCRIPTION OF THE INVENTION

An object of the present invention is to provide a switch unit having an indicator light circuit of a type which can be employed without the need for special wiring provisions and without creating a hazard or violating code requirements.

A further object is to provide an indicator light circuit connectable with a switch in a conventional wall box such that upon turning the switch to its "on" position, the indicator light flashes to indicate the energized state of a load device connected to the switch.

Another object is to provide a pilot light switch unit which can be used to replace a pilotless switch in a two-wire installation.

Yet another object is to provide a pilot or indicator light and switch arrangement which does not require a neutral wire connection in the switch box.

Briefly described, the invention includes an indicator light device for use in combination with an electrical service system for selectively energizing a load, the system including a source of electrical power, an electrical load device, a switch mountable in a switch housing at a location remote from the load device, and power, neutral and ground conductors extending from the source to the load, of which only the power and ground conductors extend to the switch housing a grounding terminal to which the ground conductor is connected and wherein the ground conductor has a prescribed maximum allowable intentional current limitation, and the switch is of the type having a first terminal connected directly to the power conductor leading to the load and means for opening and closing the switch circuit between the first and second terminals, the indicator light device comprising a circuit including a diode, a capacitor and a first resistor connected in series circuit relationship between said second terminal of said switch and the grounding conductor in the switch housing; and a gas discharge indicator lamp and a current limiting second resistor connected in series circuit relationship with each other, the series circuit thus formed being connected in parallel circuit relationship with said capacitor, said gas discharge lamp having a breakdown potential less than the voltage between said power and ground conductors so that when power is applied to said circuit said lamp periodically flashes, the values of said capacitor and first resistor being selected so that the maximum current normally flowing through said circuit and into said ground conductor is less than one-tenth of said prescribed limitation, said lamp being mounted so that light emanating therefrom is normally visible from outside of the switch housing when the switch is closed to complete a power circuit to the load device.

In order that the manner in which the foregoing and other objects are attained in accordance with the invention can be understood in detail, particularly advantageous embodiments thereof will be described with reference to the accompanying drawings, which form a part of this specification and wherein.

DETAILED DESCRIPTION OF THE DRAWINGS

Figure 1:
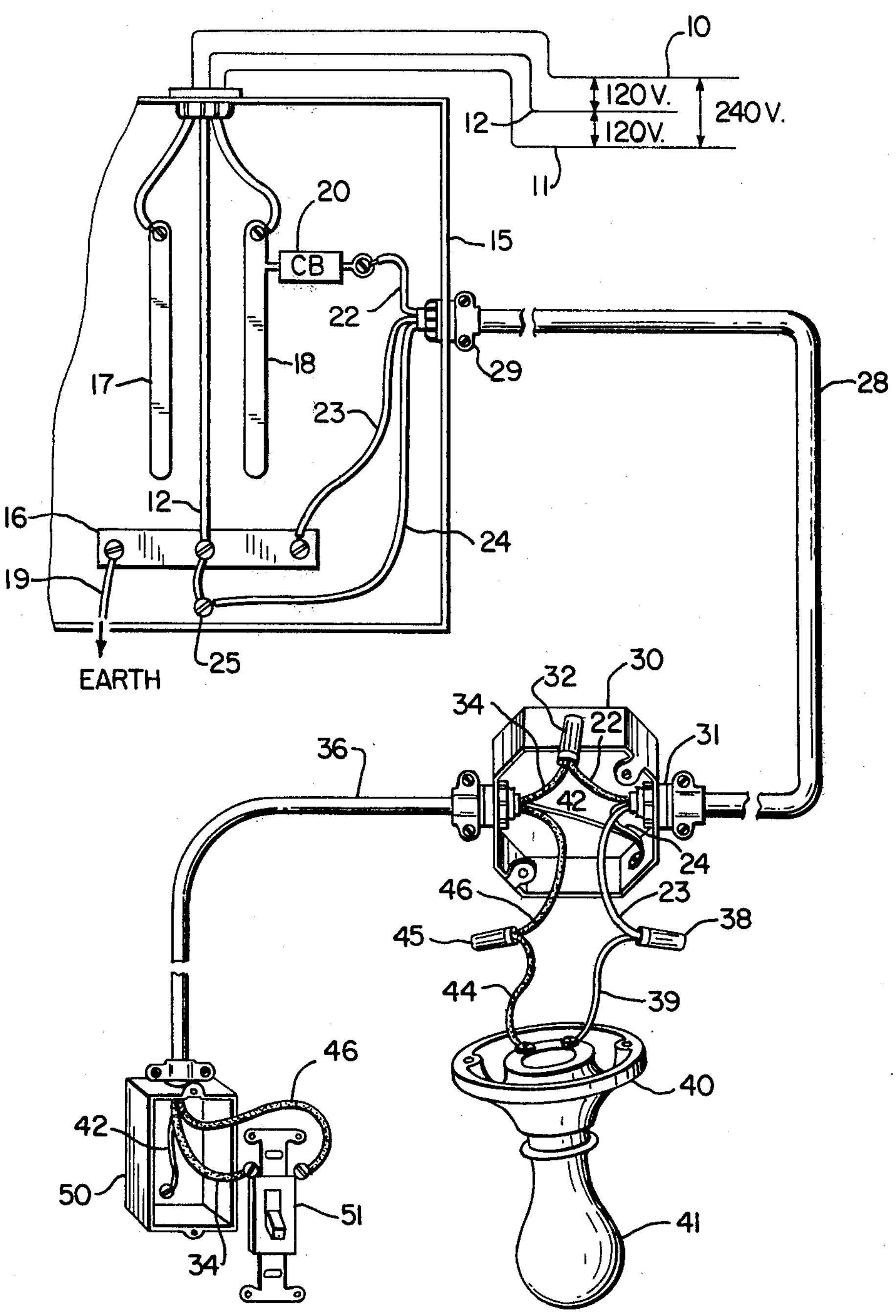
PRIOR ART FIG. 1
FIG. 1 is an illustration, partly schematic and partly perspective, of a simplified, typical and conventional wiring system for supplying power to a load through a switch.
Figure 2:
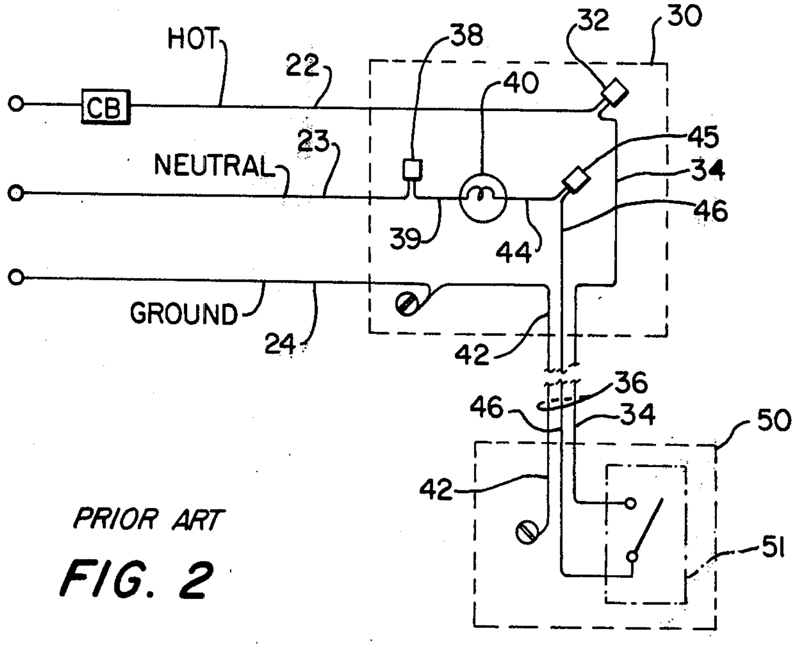
PRIOR ART FIG. 2
FIG. 2 is a schematic representation of a portion of the prior art system of FIG. 1.
Figure 3:
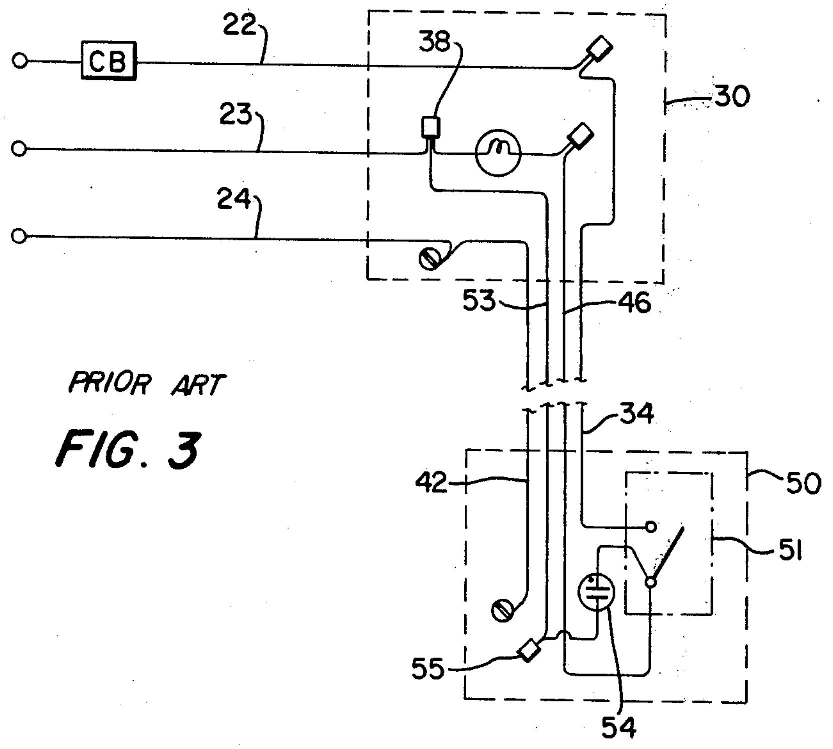
PRIOR ART FIG. 3
FIG. 3 is a schematic circuit diagram of a prior art system similar to FIG. 2 but including an indicator light.

It will be recognized that FIGS. 1, 2 and 3 are illustrations of well known and commonly used circuits in home and other building wiring. These are included because it is believed that a thorough understanding of such systems and of the terms used therewith is necessary for a full understanding of the invention.

FIG. 1 shows a typical electrical service arrangement, in greatly simplified form, for residential service. Commonly, the service is 120/240 volt service, referred to as a 120/240 V. Edison system. When two wires run to the residence, the service is 110/120 volt and when three wires are present the service is 120/240 volt. FIG. 1 shows 240 volt service with two "hot" wires 10 and 11 and a neutral or ground wire 12. In this type of service, 240 volts exists between wires 10 and 11, and 120 volts appears between neutral 12 and both 10 and 11. These wires are fed through an entrance head and meter box, not shown, and through conduit to a fuse or circuit breaker cabinet 15.

In the cabinet 15, the neutral wire 12 is connected to a neutral bar 16 which has several terminal screws and the hot wires 10 and 11 are connected to busses 17 and 18. The neutral bar 16 must be connected by a suitably heavy wire 19 directly to earth ground. Normally, a number of fuses or circuit breakers are connected to busses 17 and 18, and power for the various circuits in the building pass through those to the individual circuits. Only one circuit breaker 20 is shown in FIG. 1.

Each individual circuit for the building normally (in accordance with present day codes) includes three wires, although the cable carrying the wires can be of a type referred to as "two wire" cable or "three wire" cable. In three wire cable, three separate, individually insulated wires are housed in an insulating jacket, or a metallic jacket in the case of BX or solid conduit. In two wire cable, two conductors intended for current carrying service are individually insulated but the third wire can be bare. In the present discussion, the use of two-wire nonmetallic sheathed cable with ground will be assumed.

The circuit shown in FIG. 1 shows a hot or power conductor 22 connected to breaker 20, a neutral wire 23 connected to neutral bar 16, and a ground wire 24 connected to a ground terminal 25 in cabinet 20, the ground terminal being connected to the neutral line 12 at bar 16.

It is very important to recognize that hot and neutral wires 22 and 23, which are individually insulated except for the ends from which the insulation has been stripped to make a connection, are the wires intended to carry load current. Ground wire 24 is provided to be connected to housings or boxes for switch as and outlets and the like and is not intended to carry load current under normal conditions. It is, of course, capable of carrying current and is provided to do so to prevent electrical shock in the event of inadvertant faults in fixtures or appliances, but significant currents should not be permitted to flow therein intentionally.

Wires 22, 23 and 24 are sheathed in a nonmetallic cable 28 which passes through a suitable clamp-type fitting 29 in a wall of box 15 and extends through the building to provide current to one or more outlets, fixtures or appliances. One fixture and switch will be shown and described as an example. At that fixture, cable 28 enters a ceiling outlet box 30 through a fitting 31 wherein the cable is severed for appropriate connection. Hot wire 22 is joined by a wire nut 32 to a hot wire 34 which is part of a similar cable 36. Neutral wire 23 is joined by a wire nut 38 to a wire 39 which is connected to one terminal of a lamp receptacle 40 containing a lamp 41. Ground wire 24 is connected by a screw to box 30, and a similar ground wire 42 from cable 36 is also connected by that screw to box 30. The other terminal of receptacle 40 is connected to a wire 44 which is joined by a wire nut 45 to a wire 46 in cable 36.

Cable 36 containing wires 34, 42 and 46 extends to and through the wall of a switch box 50 which is designed to receive a conventional toggle switch 51. Wires 34 and 46 from cable 36 are connected to terminal screws at opposite sides of switch 51 so that when the switch is closed current can flow from hot wire 34 through the switch to wire 46 and then to wire 44 and the lamp receptacle 40. Ground wire 42 is connected by a screw connection to box 50.

As will be recognized, the neutral conductor in this circuit is wires 23 and 39, and the hot conductor includes wires 23, 34 and, when the switch is closed, wires 46 and 44. This can be seen in the schematic diagram of FIG. 2 which is electrically the same as FIG. 1, the wires being given the same reference numerals and the wire nuts being shown as small rectangles and being similarly numbered. It will be apparent that the neutral wire does not enter switch box 50.

Thus, in order to connect a pilot or indicator light with the switch such that the pilot is energized when the switch is closed, it is necessary to either (a) run a fourth wire 53, as an extension of the neutral, from the receptacle box 30 to switch box 50 and then connect the pilot light 54 between hot wire 46 and neutral 53 with a wire nut 55 or some other connector, a solution which is illustrated in FIG. 3; or (b) connect the pilot light between hot wire 46 and ground wire 42 in the switch box, a solution which has not heretofore been possible because the current required to illuminate a lamp to a sufficient brightness level for visibility in areas having moderate to high ambient light levels in excessive and unacceptable.

It should be noted that indicator 54 is shown as inert gasfilled bulb such as a conventional neon bulb. This type of bulb is preferred because of its lower current and lower temperature operation, although an incandescent lamp could, and sometimes is, used. In either case the minimum current creates excessive ground current. While the solution of running a fourth wire is possible, it should be recognized that this requires replacing the entire cable between boxes 30 and 51, a task which, at best, involves significant work and expense and in some cases can be extremely difficult and costly depending on the relative locations of these boxes.

Figure 4:
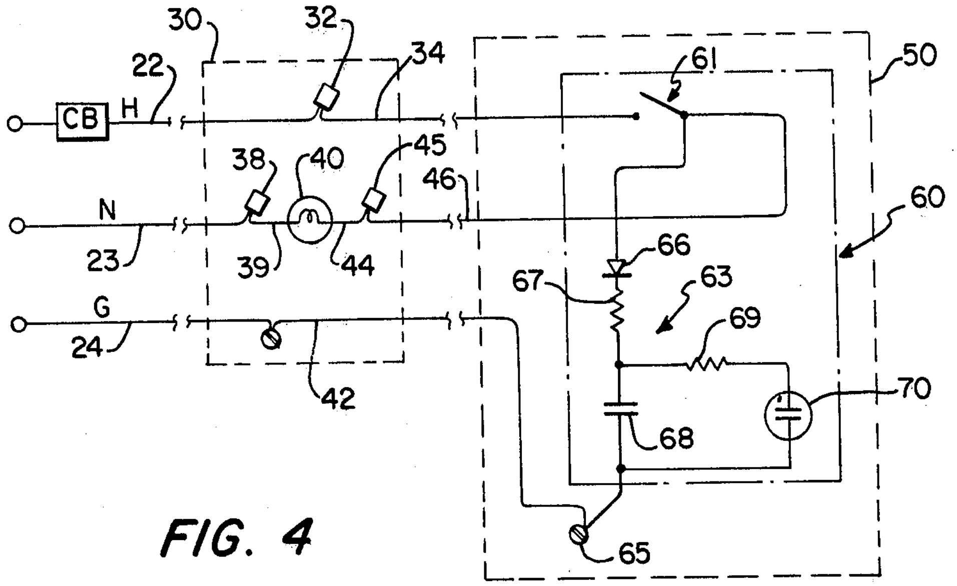
FIG. 4 is a schematic circuit diagram of a circuit in accordance with the invention.

The solution to this dilemma is provided by the present invention of which a preferred embodiment is shown in FIG. 4. It will be noted, first, that the incoming service conductors and those in receptacle box 30 require no change from the wiring arrangements shown in FIGS. 1 and 2, and that the same reference numerals have been used to identify the components thereof. Also, the switch box 50 is standard and remains unchanged.

The switch and pilot light unit in accordance with the invention is indicated generally at 60 and includes a switch 61, normally a single-pole, single-throw switch, the two terminals of which are connected to wires 34 and 46. A pulsing circuit 63 is connected between the terminal of switch 61 to which wire 46 is attached and a screw 65 to which ground wire 42 is connected. Circuit 63 includes a conventional semiconductor diode 66 connected in series circuit relationship with a fixed resistor 67 and with a fixed capacitor 68 between the switch connection and ground screw 65. In parallel circuit relationship with capacitor 68 is a series circuit including a fixed current limiting resistor 69 and a gas discharge lamp 70.

Typically, resistor 67 has a value of about 1 megohm, capacitor 68 has a value of 0.1 microfarad and resistor 69 has a value in the order of 10 kohms. With these values and with a IN4006 diode and a NE2H neon lamp, the current flowing in the ground circuit is about 26 microamperes RMS, well below that which is deemed acceptable in such a circuit. In fact, this current level is about 0.05 times the level of 0.5 ma which is deemed acceptable even in hospital circumstances.

The circuit operates as a sawtooth generator in which capacitor 68 is charged by current through diode 66 and resistor 67 until the voltage across the capacitor reaches the discharge or ionization voltage of lamp 70, whereupon the lamp flashes, discharging the capacitor, the current through the bulb during discharge being limited by resistor 69.

The repetition rate is about 6 flashes per second with the values given. A significant advantage of this circuit is that the flashing indicator light 70 is much more obvious, even at low light output level, than a constant low-level light under bright ambient conditions. It will be recognized that the circuit values can be varied to some extent to increase or decrease the repetition rate, but that the rate should not be increased significantly because such increase requires an increase in ground current.

Figure 6:
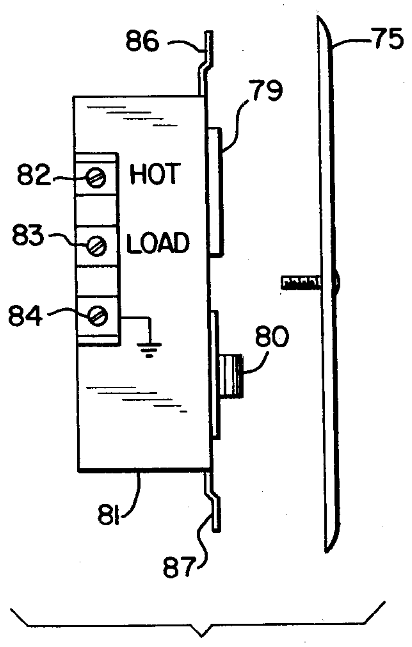
FIGS. 5 and 6 are views of a light and switch assembly.
Figure 5:
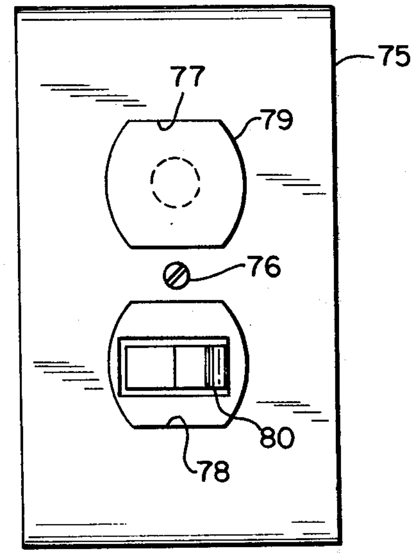

FIGS. 5 and 6 show front and exploded side elevations of one embodiment of a pilot light and switch assembly ready for installation. The assembly includes a cover plate 75, which is essentially the same as a conventional cover plate for a duplex outlet, and which has a central opening for a retaining screw 76 and openings 77 and 78 for receiving an illuminated translucent portion 79 and a switch handle 80. Translucent portion 79 covers and is illuminated by lamp 70 as the lamp flashes. A housing 81 contains the operative components of switch 61 and the components of circuit 63 which are connected and contained in any convenient manner. Screws 82, 83 and 84 form terminals which are electrically separated and which provide points of connection of the switch unit to the power (hot), load and ground wires, the screws having markings associated therewith to indicate the proper connection. Conventional tabs 86 and 87 are fastened to the housing to facilitate attachment to the wall box.

Another approach, not illustrated, which can easily be employed is to install the indicator lamp in the translucent handle of the switch itself, avoiding the need for a separate lamp support. The circuitry can then be formed on a small printed circuit board located within the housing of the switch itself.

Yet another alternative approach which can be employed is to provide, in place of the gas-filled bulb, a semiconductor switch device in series with a light-emitting diode (LED) such that the breakdown voltage produced by the capacitor causes periodic flashing of the LED.

While one advantageous embodiment has been chosen to illustrate the invention it will be understood by those skilled in the art that various changes and modifications can be made therein without departing from the scope of the invention as defined in the appended claims.

What is claimed is:

1. An indicator light device for use in combination with an electrical service system for selectively energizing a load, the system including a source of electrical power, an electrical load device, a switch mountable in a switch housing at a location remote from the load device, and power, neutral and ground conductors extending from the source to the load, of which only the power and ground conductors extend to the switch housing, and wherein the ground conductor is connected to a ground terminal in the switch housing and has a prescribed maximum allowable intentional current limitation, and the switch is of the type having a first terminal connected directly to the power conductor leading to the source, a second terminal connected to a conductor leading to the load and means for opening and closing the switch circuit between the first and second terminals, the indicator light device comprising:

a circuit including a diode, a capacitor and a first resistor connected in series circuit relationship between said second terminal of said switch and the ground conductor in the switch housing; and indicating means connected in parallel circuit relationship with said capacitor, said indicating means having a breakdown potential less than the voltage between said power and ground conductors so that when power is applied to said circuit said indicating means periodically flashes, the values of said capacitor and first resistor being selected so that the maximum current normally flowing through said circuit and into said ground conductor is less than one-tenth of said prescribed limitation, said indicating means being mounted so that light emanating therefrom is normally visible from outside of the switch housing when the switch is closed to complete a power circuit to the load device.

2. A device according to claim 1 wherein said indicating means in a gas discharge indicator lamp.

3. A device according to claim 1 wherein the current flowing through said circuit is less than about 0.1 milliamperes.

4. A device according to claim 1 wherein said lamp is filled predominantly with neon gas and wherein said first resistor and said capacitor are selected to have values of about 1 megohm and 0.1 microfarad, respectively.

5. A device according to claim 1 and further including a current-limiting second resistor connected in series circuit relationship with said lamp, the series circuit thus formed being connected in parallel circuit relationship with said capacitor.

6. A switch and indicator light unit for use in combination with an electrical service system for selectively energizing a load, the system including a source of electrical power, an electrical load device, a metallic switch housing at a location remote from the load device, and power, neutral and ground conductors extending from the source to the load, of which only the power and ground conductors extend into the metallic switch housing, and the ground conductor is connected to the metallic switch housing and has a prescribed maximum allowable intentional current limitation, a second housing insertable in said metallic housing, said and housing having a gas discharge indicator lamp having a breakdown potential less than the voltage between said power and ground conductors;

a face portion with an exposed, manually operable switch actuating member and means for supporting said lamp so that light produced thereby is visible;

at least three electrically separate screw terminals, a first one of said terminals being connectable to the power conductor extending into said metallic housing a second of said terminal being connectable to a conductor extending to the load device and a third terminal being connectable to said ground conductor;

a switch in said housing having a first contact electrically connected to said first terminal, a second contact electrically connected to said second terminal and a movable member for selectively electrically connecting said first and second contacts together, said movable member being mechanically coupled to said switch actuating member;

a circuit in said housing including a diode, a capacitor and a first resistor connected in series circuit relationship between said second contact of said switch and said third terminal; and said gas discharge indicator lamp being connected in series circuit relationship with a current limiting second resistor, the series circuit thus formed being connected in parallel circuit relationship with said capacitor, the values of said capacitor and first resistor being selected so that the maximum current normally flowing through said circuit and into said ground conductor is less than one-tenth of said prescribed limitation.

* * * * *